No. 689,159. Patented Dec. 17, 1901.
F. A. BROWNELL.
PANORAMIC PHOTOGRAPHIC CAMERA.
(Application filed July 25, 1900.)
(No Model.) 3 Sheets—Sheet 1.
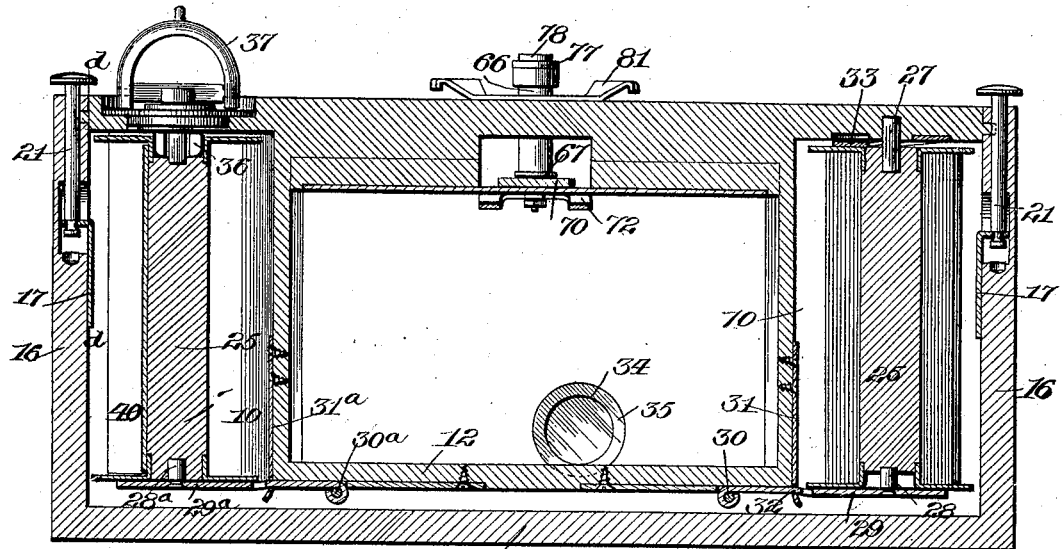
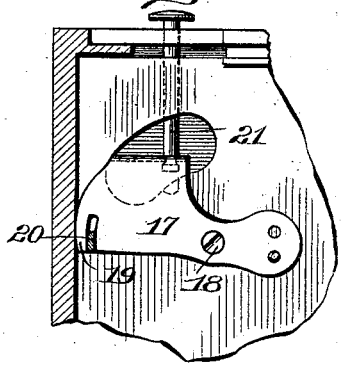
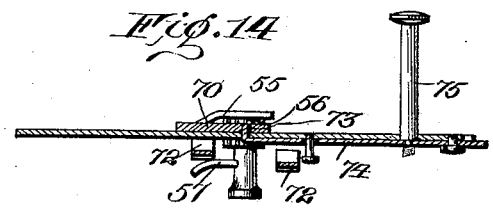
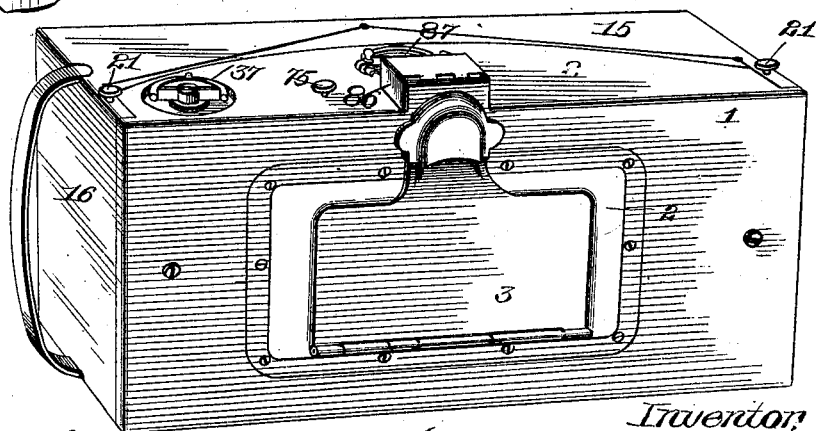
Witnesses,
G. Willard Rich.
Walter B. Payne.
Inventor,
Frank A. Brownell
by Frederick L. Church
his Attorney No. 689,159. Patented Dec. 17, 1901.
F. A. BROWNELL.
PANORAMIC PHOTOGRAPHIC CAMERA.
(Application filed July 25, 1900.)
(No Model.) 3 Sheets—Sheet 2.
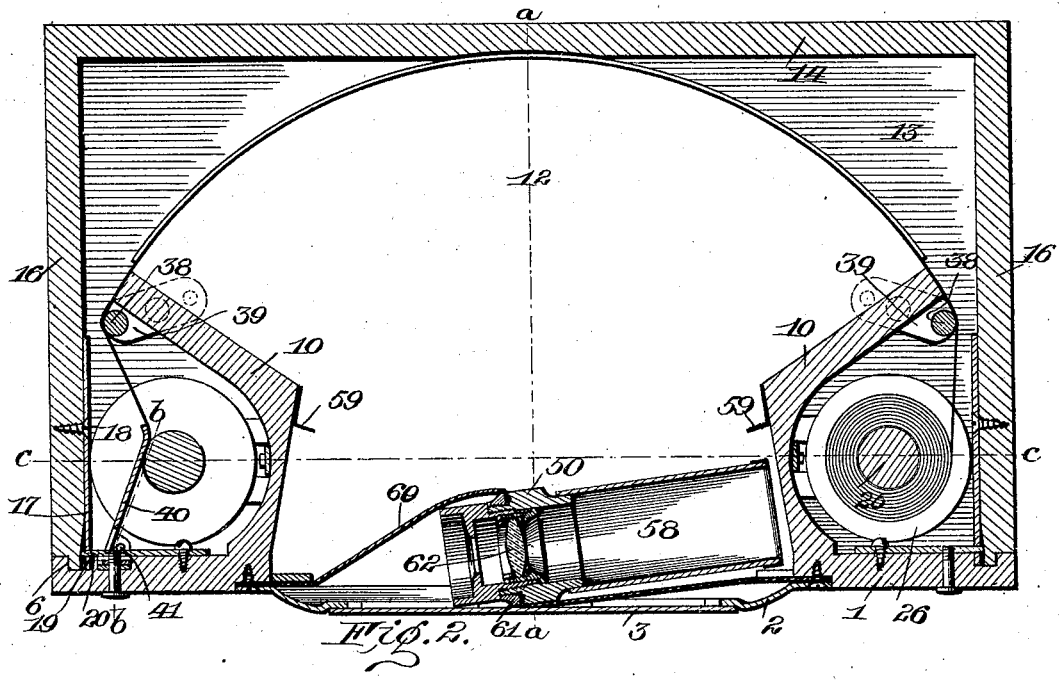
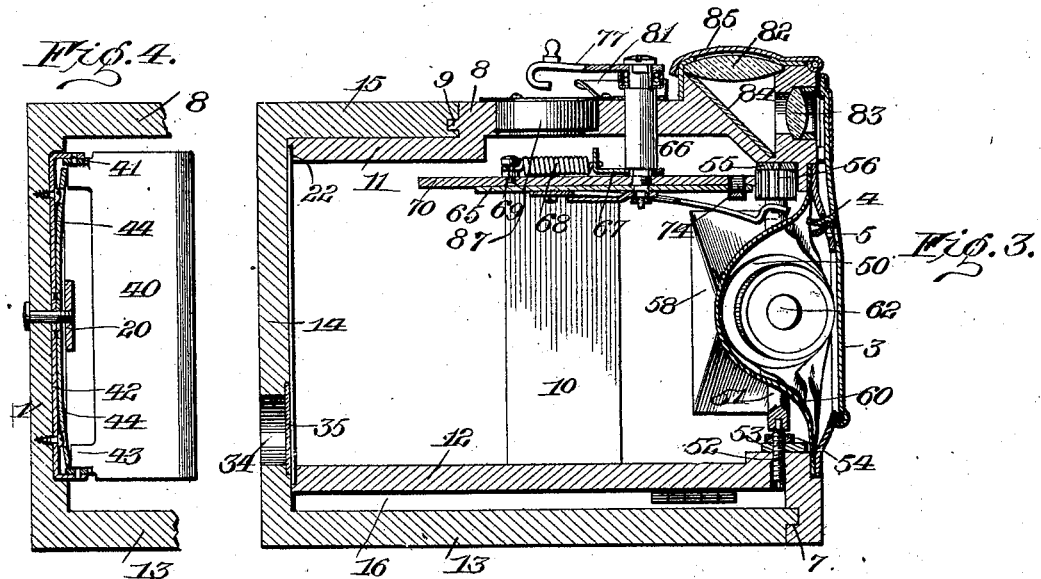
Witnesses.
Inventor,

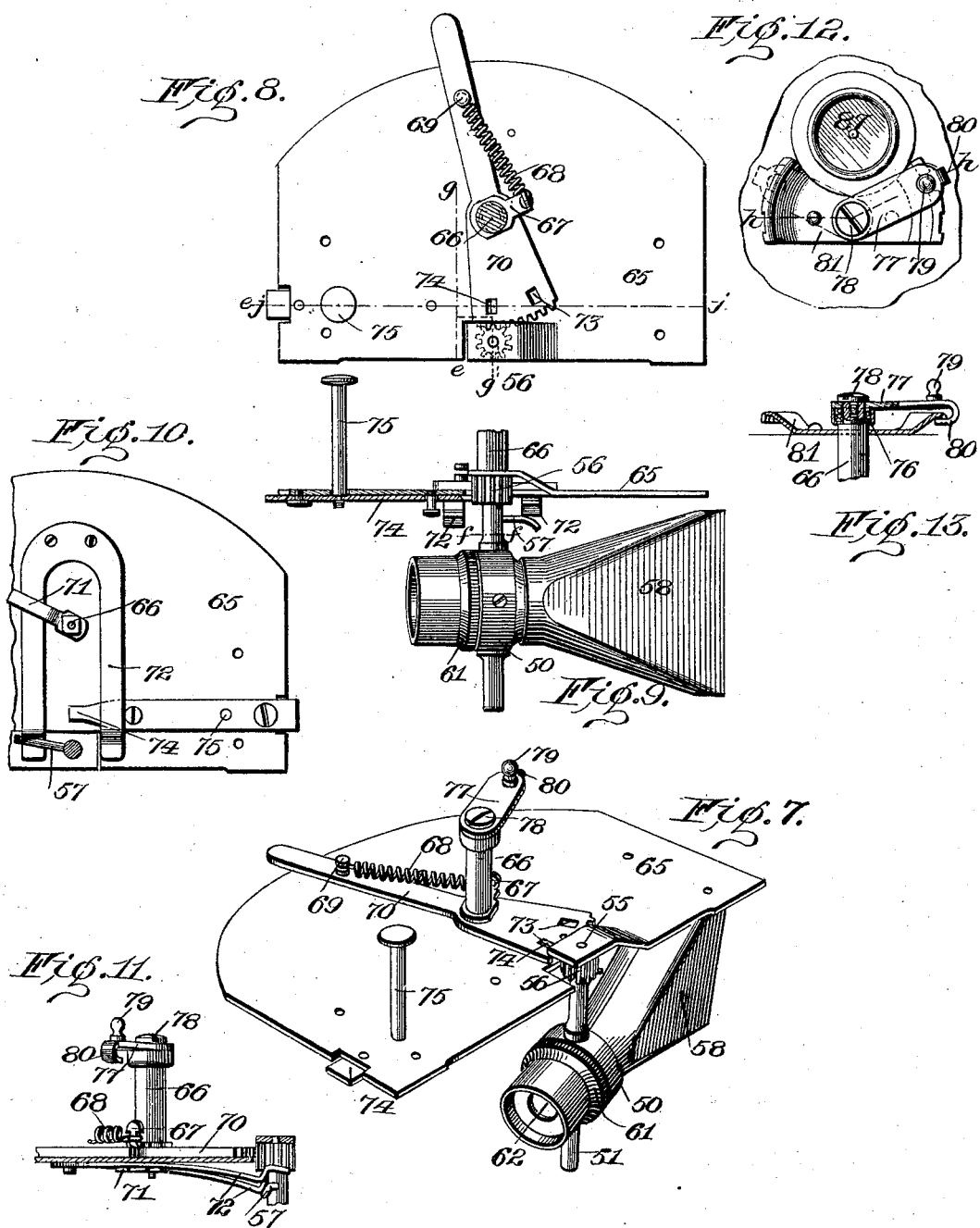

United States Patent Office.

FRANK A. BROWNELL, OF ROCHESTER, NEW YORK, ASSIGNOR TO THE EASTMAN KODAK COMPANY, OF ROCHESTER, NEW YORK, A CORPORATION OF NEW YORK.

PANORAMIC PHOTOGRAPHIC CAMERA.

SPECIFICATION forming part of Letters Patent No. 689,159, dated December 17, 1901.

Application filed July 25, 1900. Serial No. 24,800. (No model.)

*To all whom it may concern:*

Be it known that I, FRANK A. BROWNELL, of Rochester, in the county of Monroe and State of New York, have invented certain new and useful Improvements in Panoramic Photographic Cameras; and I do hereby declare the following to be a full, clear, and exact description of the same, reference being had to the accompanying drawings, forming a part of this specification, and to the reference-numerals marked thereon.

My present invention has for its object to provide an improved panoramic camera in which different portions of the sensitized surface, such as film, are successively exposed to the action of the rays of light passing through the lens, said lens preferably rotating upon a vertical axis coincident with its center or at the point where the rays of light cross; and it consists in certain improvements in the casing whereby the film may be readily applied and removed and to certain improvements in shutter mechanism and also to certain details of construction, all as will be hereinafter fully described, and the novel features pointed out in the claims at the end of this specification.

In the drawings, Figure 1 is a perspective view of a panoramic camera constructed in accordance with my invention; Fig. 2, a horizontal sectional view of the same; Fig. 3, a vertical central sectional view on the line $a\,a$ of Fig. 2; Fig. 4, a vertical section on the line $b\,b$ of Fig. 2; Fig. 5, a vertical section on the line $c\,c$ of Fig. 2; Fig. 6, a vertical section on the line $d\,d$ of Fig. 5; Fig. 7, a perspective view of the shutter and operating mechanism; Fig. 8, a top plan view of the same; Fig. 9, a sectional view on the line $e\,e$ of Fig. 8; Fig. 10, a sectional view on the line $f\,f$ of Fig. 9 looking upwardly; Fig. 11, a sectional view on the line $g\,g$ of Fig. 8; Fig. 12, a plan view of the shutter-setting arm and the leveling-device; Fig. 13, a sectional view on the line $h\,h$ of Fig. 12; Fig. 14, a sectional view on the line $j\,j$ of Fig. 8.

Similar reference-numerals indicate similar parts.

In the present embodiment of my invention the camera consists of two separable parts, one containing the shutter and film-holding devices and the other a casing serving to cover the film and the operating parts. The first-mentioned part embodies the front board 1, provided with the central aperture, around which aperture extends a metal frame 2, having hinged at the lower portion thereof a lid or door 3, provided with a tongue or catch projection 4, adapted to coöperate with a spring-lip 5 to normally hold the door in the closed position, but permitting the latter to be easily opened when desired. The front 1 is provided upon its rear side near its ends and bottom edges with grooves 6 and 7, adapted to receive tongues formed upon the bottom and side portions of the casing. At the top of the front 1 is the rearwardly-extending top board 8, having upon its rear edge a tongue 9, adapted to engage a corresponding groove formed in the top of the removable casing, which portion of the latter is adapted to overlap an extension 11 of the top board 8, which forms a support for one edge of the film, as will be described.

12 indicates the rearwardly-extending bottom board forming a support for the opposite side of the film, and between the top and bottom boards, at the ends of the front, are provided partitions 10, forming film chambers or pockets. The removable section or cover is adapted to inclose the rearwardly-projecting boards 11 and 12 and the film-pockets 10 and consists of the bottom 13, rear side 14, the top 15, and the end portions 16, and the sides and bottom edges of the section are provided with the tongues engaging the grooves 6 and 7 upon the corresponding portions of the front 1, and in the top is arranged a groove adapted to receive the tongue 9 on the edge of the top 8, providing a light-tight joint between the meeting edges of the removable casing and the front board preventing the entrance of light to fog or otherwise affect the sensitive film.

In order to secure the parts in position, I provide a locking device between the front board and removable section, in the present instance consisting of plates 17, pivoted upon screws 18 on the inner sides of the end portions 16 of the removable casing and having upon their forward edges a lip or hook 19, adapted to engage over the end of a plate 20, secured upon the front 1. A suitable operating device in the form of headed pins or plungers 21, accessible from the top of the casing, are secured to the plates 17, whereby the latter may be moved upon their pivots to engage or disengage the plates 20, as may be desired.

The top and bottom boards 11 and 12 extend across the interior of the casing upon opposite ends of the film-chambers 10, and upon their rear edges are curved, as shown, upon a radius described from the center upon which the oscillating lens is revolved, slight grooves or channels 22 being formed to guide and support the edges of the film in its curved path in rear of the lens.

25 indicates the film-spools, having the flanges 26 upon their extremities and being provided upon their ends with suitable apertures or slots adapted to receive centering devices in the film-pockets 10. In the present instance I have shown the full reel or spool containing the unexposed film upon the right-hand side of the camera and the winding spool or reel upon the opposite end, with a suitable winding mechanism in the casing adapted to be detachably connected thereto. The first-mentioned spool is loosely journaled in the film-chamber, a pin 27, secured in the top 8, forming a stationary center for one end of the spool, while a similar pin 28 engages the lower end of the spool, and to permit the easy application and removal of the latter I arrange the pin 28 on a plate 29, secured to the bottom 12 and provided with a hinge 30, said plate being retained in position by a spring-latch 31, having an aperture near its end engaging a tongue 32 thereon.

33 indicates a leaf-spring adapted to engage the top of the spool and prevent its free rotation and to afford sufficient frictional engagement to keep the film taut.

The film or sensitive paper usually employed in cameras of this description, known as "daylight-loading," is wound upon the spool with an opaque covering or backing, and upon the exterior of the latter are provided a series of marks or designating-numerals indicating the number of exposures and also when a fresh strip of film has been wound into position after each exposure. In order to permit the operator to view these marks, I provide an aperture 34 in the rear side 14 of the removable casing, and over the inner end thereof I arrange a transparent ruby covering 35, of glass or similar material.

Upon the left-hand end of the camera-body is the film-chamber, in which the receiving spool or reel is mounted, and arranged at the lower end thereof is a pin 28ª, which enters the recessed end of the spool, said pin being mounted upon a plate 29ª, hinged at 30ª and retained by a spring-catch 31ª, similar to that at the other side of the camera. The upper end of the winding spool or reel is engaged by the lower flanged end of a winding-key 36, having the operating-handle 37 and provided with suitable ratchet or clamping devices which prevent the rotation in but one direction. At the edges of the spool-chambers are provided small rollers 38, mounted upon plates 39, and with which the face of the film is in contact, said rollers serving to lessen the friction as the film is moved from one spool to the other. In order to provide a slight tension upon the back of the black paper and insure said paper and the film winding evenly upon the reel or take-up spool, I provide a tension device embodying a plate 40, pivoted at 41 in lugs at the ends of the plate 42, secured in the front board 1. The plate 40 is provided with lugs or ears 43, extending in rear of the pivot and operated upon by the ends of a flat spring 44, said ends pressing toward the center of the pivot and serving to hold the tension-plate 40 with a yielding pressure against the film or paper on the spool when the camera is closed and serving also to retain the plate in outward position away from the spool when the lugs 43 are moved in the other direction across the center, so that the spool may be readily applied when the holding devices are moved from the inclosing casing.

When it is desired to load the camera, it is only necessary to lift the pins 21, connected to the catch-plates 17, and withdraw rearwardly the casing-section, composed of boards 13 to 16, inclusive, thereby exposing the open-sided film-chambers, and a full spool of cartridge-film is placed in the chamber to the right and centered upon the pins 27 and 28, and the plate 29 is moved upon and caught by the catch 31. The black paper of the cartridge is then moved around the rear of the film-support, and its end is attached to the winding-spool arranged in the chamber to the left and centered upon the projection 28ª and upon the winding-spool, said spool being secured by the removable plate 29ª. The parts of the casing are then placed together and secured as before. The tension-plate 40, which was moved back for the purpose of inserting the spool, is moved forward, so as to rest upon the black paper of the cartridge, as shown in Fig. 2, and the operator then winds forward the film until the indicating-mark upon the rear of the paper is visible through the aperture 34 in the casing, then operates the exposing device or shutter, as will be presently described, and then winds forward the film and black paper for a new exposure. When all of the exposures have been made, the exposed cartridge may be removed by separating the parts of the casing as before and a new one inserted.

In a camera of this description it is desirable that the exposure be formed by the oscillation of the exposing-tube, preferably containing or inclosing a lens, said lens being mounted upon the pivotal points of the tube, and as the rear end of the tube is moved across parallel with the curved film-support portions of the film from end to end will be successively exposed to the rays of light passing axially through the lens. In the present embodiment of my invention this shutter or exposing device embodies a collar 50, upon the opposite sides of which is a vertically-extending spindle or arbor 51, the lower end of said arbor being journaled upon an adjusting-screw 52, operating through a plate 53, secured mediately or immediately to the front board 1 of the casing. A lock 54 is provided for holding said screw in adjusted position. The upper end of the spindle or arbor is journaled in a lug or ear 55 of a plate 65, secured mediately or immediately to the front board 1 and is provided with a pinion 56 and beneath this with a laterally-extending arm 57. Secured to the rear end of the collar 50 is a tube 58, flaring vertically toward the rear end and adapted when the tube is on one side or the other of the center to extend in close proximity to the inner sides of the partitions 10. Secured to the partitions are flaps 59 of leather, cloth, or similar flexible material for preventing the passage of light through the tube 58 to the film when said tube is moved to either side; but said flaps will permit the passage of the tube when making an exposure.

60 indicates a piece of flexible material, such as leather, secured at its outer edges beneath the front frame or plate 2 and having a central perforation through which extends the tube or collar 50, the portions of said flexible covering around said collar being secured by a collar 61, as shown in Fig. 2, so that while the collar and tube are permitted to oscillate on the arbor this flexible covering 60 will prevent the passage of light to the film excepting through the oscillatory tube.

62 indicates the lens, secured within the collar 50 and having its vertical center in line with the vertical arbor or spindle 51. From this it will be seen that as the collar and tube 58 are oscillated across from side to side the film will be exposed, as described.

As a means for oscillating the tube 58 and lens in opposite directions alternately I provide a reversible spring-actuated device capable of being set for oscillating the tube in opposite directions and of being released by the operation of a suitable catch, so that successive exposures may be made without capping the lens for the purpose of resetting the shutter. In the present arrangement this operating device is mounted upon a plate 65, in which is journaled an oscillatory setting arbor or shaft 66, having rigidly secured to it an arm 67, connected to a spring 68, the other end of said spring being connected to a pin 69 on a lever 70, pivoted loosely upon the arbor or shaft 66 and having at its forward end a segmental rack meshing with the pinion 56 on the upper end of the arbor carrying the tube 58. Secured rigidly to the lower end of the arbor 66 is an arm or finger 71, adapted to coöperate with spring-latches preferably formed of a single piece of spring material secured at the center to the plate 65, said spring-catches having shoulders at their forward ends adapted to engage, respectively, with the pin or arm 57 upon the arbor of the lens-tube. The forward end of the pivoted lever 70 is provided with two notches or recesses 73, with which is adapted to engage the bent end of a spring-catch 74, secured at its outer end to the plate 65 and operated upon by the lower end of a vertically-movable pin 75, extending to the exterior of the casing in position to be moved by the operator. The upper end of the arbor 66 is provided with the recessed portion, in which is arranged a small spiral spring 76, operating on the under side of the operating-handle 77, secured to the arbor by a screw 78, the outer end of said arm having an operating-knob 79 and the inwardly-extending projection 80, adapted to be engaged with a notched downwardly-extending flange formed upon the plate 81, mounted upon the top of the casing. Instead of employing the spring 76 it will be understood that the arm 77 could be made of spring material, so that the outer end would be raised into engagement with the notched plate by its own resiliency. The spring 76 operates to lift the outer end of the arm and to hold the projection engaged with the described notches, so that when the arm is moved around to either of the extreme positions shown in full and dotted lines in Fig. 12 the arbor 66 will be retained in this position, and as the arm 67, connected to the spring, is in the present arrangement directly beneath the operating-arm 77 the spring 68 will be placed under tension, and as the lever 70 is retained by the catch 74 the shutter can only be operated when said catch is released. In order to set the shutter for operation from, for instance, the position shown in full lines in Fig. 12, to which it was last moved, the operator grasping the operating-arm 77 disengages said arm from the serrated catch-plate and moves it across the center, engaging it with the notches upon the other side to the position in dotted line in Fig. 12, this operation placing the spring 68 under tension, and the arm at the lower end of the arbor 66 lifts the retaining-latch 72 out of the path of the arm 57 on the arbor 51, the lever 70 being retained by the catch 73. In order to make an exposure, the front door 3 of the casing is opened and the operator presses upon the pin 75, disengaging the catch from the lever 70 and allowing the spring 68 to oscillate said lever on its pivot, turning the lens-tube in the opposite direction and causing the open rear end of the tube to move across the film. As the tube moves around, the pin 57 on its arbor passes beneath the spring-latch 72, which is not engaged by the arm 71, and becomes engaged with the shoulder at the end thereof, preventing its rebounding and holding said tube. When it is desired to cause another operation of the exposing-tube, this time in the opposite direction, the operating-arm at the top of the arbor 66 is moved in the other direction and engaged with the notched plate, placing the spring under tension, so as to throw the tube in the opposite direction and causing another exposure. Thus the exposing or lens tube is moved in opposite directions alternately and is effectually prevented from rebounding. The extreme movement of the exposing-tube is checked by suitable buffers 89, with which it contacts at the extremes of its movement.

The camera is further provided with a finder arranged at the center of the upper portion and embodying lenses 82 and 83 and a mirror 84, a movable hood or shade embodying the pivoted top plate 85 and side wings 86 being arranged over the upper lens. Also arranged in the top of the casing is a leveling device, (indicated by 87,) which may be of the usual or any preferred construction, by means of which the operator can hold the camera level when making an exposure.

The camera as a whole is simple, certain in operation, and by employing a reversible shutter mechanism the operator is not required to cap the lens when setting the shutter, and therefore is not liable to make a double exposure. It will be noted that the casing and front board carrying the operating parts are so arranged and constructed that when the casing is removed access may be readily had to the film-chambers and film-supports to apply or remove the spools of exposed and apply fresh film without the necessity of threading the paper or film through narrow slits or passages.

I do not claim herein the particular construction of the shutter and its operating mechanism, as this will form the subject-matter of another divisional application.

I claim as my invention—

1. In a panoramic camera, the combination with the front board having a front opening, and a rearwardly-extending top piece thereon, rearwardly-extending boards secured to the front board curved at the rear ends to form a film-support, and open-sided film-chambers at the opposite ends of said support, and motor devices for operating the lens-tube mounted on the extension of the front board, of the removable casing embodying the rear and the top, bottom and side pieces connected thereto, said side and bottom pieces coöperating with the front board, and the top coöperating with the rear edge of the top piece on the front board.

2. In a panoramic camera, the combination with the front board having the aperture, a rearwardly-extending top piece secured thereto, a pivoted oscillatory lens-tube and rearwardly-extending boards mounted on the front and curved at their rear ends to form a film-support, open-sided film-chambers at the opposite ends of said support, and spool-holding devices therein, and motor devices for operating the lens-tube and a catch mounted on the top extension of the front board and accessible from the exterior of the camera, of a removable casing coöperating with the top piece and front boards and adapted to cover the film-support and film-chambers.

3. The combination with the front board having the central aperture, the flexible covering, the rearwardly-extending swinging lens-tube connected to the flexible covering, reversible spring-motor devices for swinging the lens-tube in either direction, and a catch for retaining it, of the rearwardly-extending curved film-guides attached to the front board, the open-sided film-chambers at the ends of the guides, spool holding and centering devices at the ends of the film-chambers, and a removable casing embodying the connected top, bottom, rear and side pieces coöperating with the front board and inclosing the film guides and chambers.

4. The combination with the front board having the rearwardly-extending top piece and the central opening, the flexible covering for the opening, the swinging lens-tube connected to the flexible covering, a motor for operating the lens-tube, and a catch for retaining it, setting devices for the motor mounted on the top piece, of the rearwardly-extending curved film-guides attached to the front board, open-sided film-chambers at the ends of the guides, spool-centering devices in the chambers, and a removable casing embodying the top, bottom, rear and side pieces coöperating with the front board and its extension and inclosing the film guides and chambers.

5. The combination with the front board having the rearwardly-extending top piece, the rearwardly-extending curved film-guides below the top piece, the open-sided film-chambers at the ends of the guides, spool-centering devices in the chambers, and a winding-key extending through the top piece into one of the film-chambers, of an oscillatory lens-tube operating between the film-guides, motor devices for acuating it operable from the exterior of the top piece, and a catch located in the top piece and accessible from the upper side thereof, and a removable casing coöperating with the front board and its extension and inclosing the film guides and chambers.

6. The combination with the front board having the rearwardly-extending top piece, the boards having the curved rear sides constituting film-guides, the film-chambers at the ends of the guides, a film-winding key extending through the top piece into one of the film-chambers, the movable plates at the bottom of the film-chambers having spool-centers therein, of a removable casing embodying the top, rear, bottom and side pieces and coöperating with the front board and extension.

7. A camera having a film-spool chamber and spool-centering devices therein, in combination with a pivoted friction-plate, and a spring operating upon said plate on opposite sides of its pivot to hold it in contact with the film on a spool on the centering devices or away from it to permit the introduction or removal of a spool.

8. In a camera provided with an open-sided film-spool chamber, the combination with spool-centering devices located in the chamber, of a pivoted friction-plate movable toward and away from the centering devices, and a spring operating upon the plate on opposite sides of the pivot to hold it in contact with or away from a spool.

9. In a camera, the combination with a film-holding chamber having a spool-centering device at one end, of a hinged plate at the other end of said chamber having a coöperating centering-pin thereon, and a spring-catch engaging the plate and holding it with the pin in the end of a film-spool.

10. Combined in a panoramic camera, a case, a pivoted lens and lens-mount, two end compartments for holding the winding and supply spools, a central compartment placed betwixt the two end compartments, said central compartment limited at its posterior side by circularly-positioned film-guides adapted to guide a sensitized film in the circular-positioned focal field of the pivoted lens, spool and reel centers placed in the end compartments and an outer protective front on the camera-case, which front is adapted to open and close.

11. In a panoramic camera, the combination with the casing having an opening at the front, spool-centering devices in the casing and a curved film-guide, of a swinging lens-holder operating in the front opening, and a door for the front opening in the casing adapted to extend over the lens-holder.

12. In a panoramic camera, the combination with the camera-casing having the front opening and the finder arranged above it, of the hinged door adapted to extend over the opening in the casing and over the front of the finder, and the swinging lens-holder adapted to project through the opening in the casing.

13. In a panoramic camera, the combination with the casing having the front opening, the flexible cover therefor, the swinging lens-holder attached to and projecting through the flexible cover, of the front plate having the aperture and the hinged door thereon, said plate holding the flexible cover in position.

14. In a panoramic camera having the front opening, the flexible cover attached to the edges thereof and the swinging lens-holder extending through the flexible cover, of the frame attached to the edges of the front aperture in the casing, the door hinged thereon and the catch between the door and its frame.

15. Combined in a panoramic camera, a case, a pivoted lens-mount and lens, two end compartments for holding the winding and supply spools, a central compartment placed betwixt the two end compartments, said central compartment limited at its posterior side by circularly-positioned film-guides adapted to guide a sensitized film in the circular-positioned focal field of the pivoted lens, and spool and reel centers placed in the end compartments.

FRANK A. BROWNELL.

Witnesses:
ELIZABETH B. ROBY,
GEORGE BAXTER.